(12) United States Patent
Saarenpää et al.

(10) Patent No.: US 8,435,442 B2
(45) Date of Patent: May 7, 2013

(54) SYSTEM FOR DECREASING AMOUNT OF ORGANIC SOLUTION IN THE LIQUID-LIQUID EXTRACTION PROCESS

(75) Inventors: Timo Saarenpää, Santiago (CL); Hannu Laitala, Espoo (FI); Pertti Pekkala, Espoo (FI)

(73) Assignee: Outotec Oyj, Espoo (FI)

( * ) Notice: Subject to any disclaimer, the term of this patent is extended or adjusted under 35 U.S.C. 154(b) by 184 days.

(21) Appl. No.: 12/991,942

(22) PCT Filed: May 12, 2009

(86) PCT No.: PCT/FI2009/050388
§ 371 (c)(1), (2), (4) Date: Nov. 10, 2010

(87) PCT Pub. No.: WO2009/138563
PCT Pub. Date: Nov. 19, 2009

(65) Prior Publication Data
US 2011/0068520 A1    Mar. 24, 2011

(30) Foreign Application Priority Data
May 15, 2008   (FI) ................................. 20080359

(51) Int. Cl.
*C21B 3/02* (2006.01)

(52) U.S. Cl.
USPC ............................... 266/170; 75/726

(58) Field of Classification Search .......... 266/170; 75/726
See application file for complete search history.

(56) References Cited

U.S. PATENT DOCUMENTS 5,662,861 A * 9/1997 Taylor .......................... 266/170
5,662,871 A   9/1997 Nyman et al.
6,132,615 A   10/2000 Nyman et al.

OTHER PUBLICATIONS

International Search Report (PCT/ISA/210) issued on Jul. 31, 2009, by Finnish Patent Office as the International Searching Authority for International Application No. PCT/FI2009/050388.

* cited by examiner

*Primary Examiner* — Scott Kastler
(74) *Attorney, Agent, or Firm* — Buchanan Ingersoll & Rooney PC

(57) ABSTRACT

The invention relates to a system used in the liquid-liquid extraction of metals, enabling the amount of organic solution required in the various stages of extraction to be significantly reduced. In accordance with the invention, the settler unit of one step belonging to an extraction system is selected to function also as the organic solution storage and pumping tank.

5 Claims, 1 Drawing Sheet

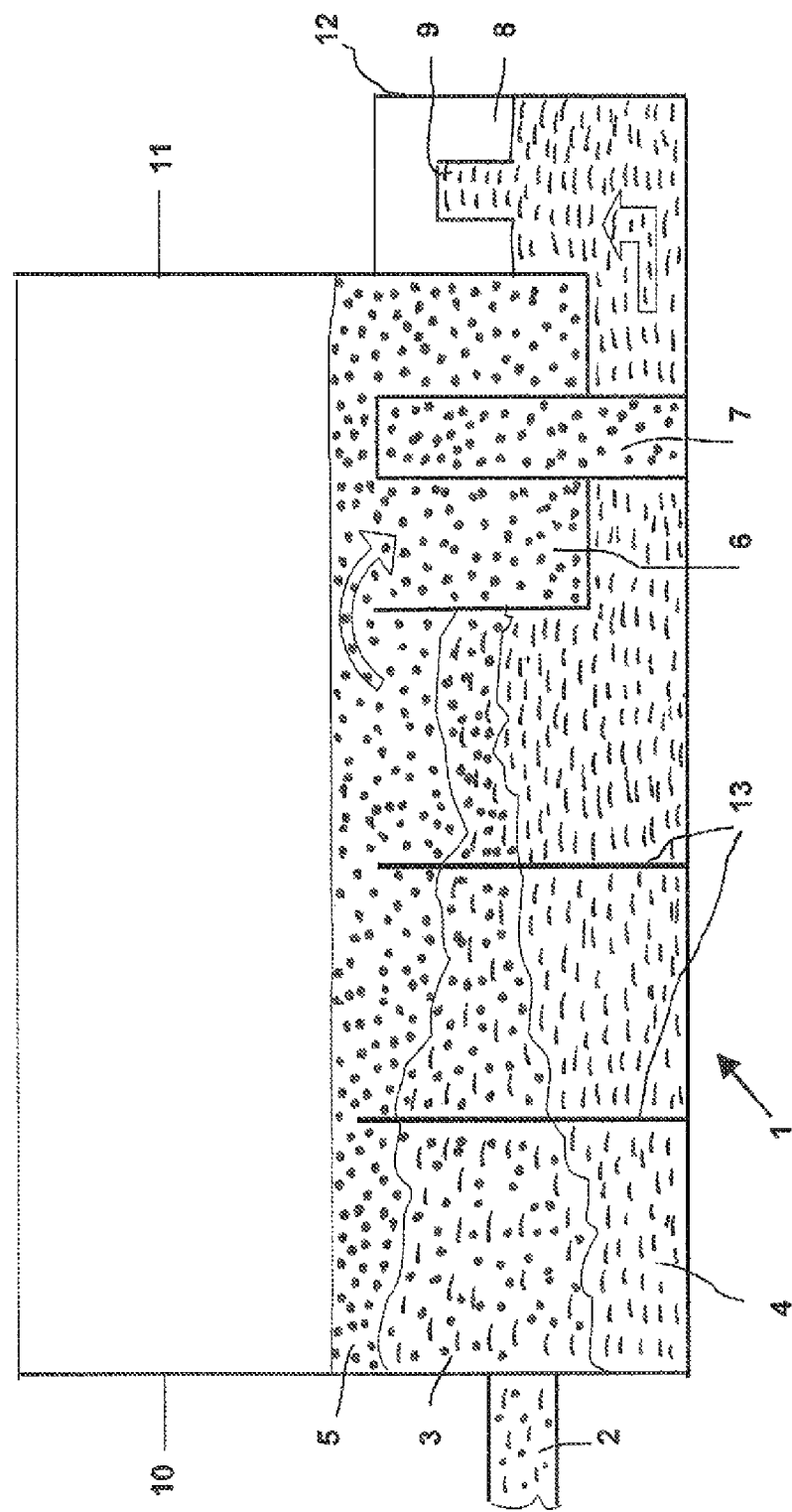

SYSTEM FOR DECREASING AMOUNT OF ORGANIC SOLUTION IN THE LIQUID-LIQUID EXTRACTION PROCESS

FIELD OF THE INVENTION

The invention relates to a system used in the liquid-liquid extraction of metals, which allows the amount of organic solution required in the various stages of extraction to be significantly reduced. According to the invention the settling unit of some step belonging to an extraction system is selected and designed to operate also as an organic solution storage and pumping tank.

BACKGROUND OF THE INVENTION

In liquid-liquid extraction, the organic extraction solution is mixed into an aqueous solution, where said aqueous solution contains a dissolved is substance to be purified and concentrated, a metal often in ion form or as a complex together with numerous impurities. The valuable metal or element to be refined reacts selectively with an organic extraction chemical, whereby it is made to separate in pure form into the organic extraction solution. The aqueous solution depleted of the valuable metal or raffinate is generally routed back to ore or concentrate leaching. The valuable metal or element can then be separated from the organic solution by the reverse chemical reaction to extraction into a second aqueous solution (stripping). The organic extraction solution depleted of the valuable metal is recycled back to the extraction stage. The pure aqueous solution containing the valuable metal is processed further to recover the metal, e.g. by precipitation or reduction to metal (electrolytic recovery).

In some cases the aqueous solution exiting ore or concentrate leaching may contain several valuable metals. In this case the purpose of extraction may be to separate one or some of the metal impurities from the aqueous solution into an organic extraction solution, particularly if the amount of impure metal is considerable. Then the aqueous solution, removed from the extraction stage and purified of impure metals, is routed to further treatment, and the valuable impure metal is transferred from the extraction solution to another aqueous solution in stripping, and the extraction and aqueous solutions are processed as described above.

In accordance with the above, a liquid-liquid extraction system is formed of several stages, which are for example extraction proper, scrubbing of the organic solution, and stripping. Both the extraction and stripping stages may consist of several steps, whereby each step comprises an aqueous and organic solution mixer and a settler where the solutions separate from each other. The extraction solution scrubbing step is also formed of a mixer and settler or in some other appropriate way. An extraction stage is described in U.S. Pat. No. 5,662,871, where the mixer consists of a pumping tank, into which the aqueous solution and the extraction solution are fed, plus two mixers, in is which the mixture of solutions are further dispersed. The dispersion of the mixed solutions is routed to the settler unit of the extraction step to separate out into separate layers. It is characteristic of extraction that the organic solution used is recirculated in the extraction system. It is also typical of the system that there is a separate storage tank for the organic solution, which is equipped with pumping apparatus. In drawings the tanks are generally marked with the term LO tank, which means a tank for an organic solution containing valuable metals (Loaded Organic tank). Nowadays a storage tank is included in all liquid-liquid extraction systems as one unit. In some systems it may be what is termed a tank with scrubbing properties, but in addition the system also comprises a scrubbing step consisting of a mixer and settler.

The storage tank is in the system among other reasons so that part of the organic solution volume can be routed there in case of disturbance or production stoppage. The organic solution storage tank forms a large and expensive part of the system, since for instance in normal large extraction systems its volume may be of the order of 2000-2500 $m^3$. The organic solution storage tank functions primarily as a pumping tank, which means that there has to be a certain solution depth in the tank in normal operating situations for pumping to succeed. Since the price of extraction solution is fairly high, the amount of extraction solution required in the storage tank for pumping raises the overall investment costs of the extraction system. Extraction solution is a flammable liquid, so the large quantity of organic solution circulating in a conventional extraction system increases the possible fire load of the liquid-liquid extraction process.

PURPOSE OF THE INVENTION

The purpose of the liquid-liquid extraction system now developed is to reduce the amount of organic solution in the extraction system and thus avoid the weaknesses of the systems accordant with the prior art.

SUMMARY OF THE INVENTION

The essential features of the liquid-liquid extraction system according to the invention will be made apparent in the attached claims.

The invention relates to an aqueous solution and organic solution liquid-liquid extraction system used in the hydrometallurgical recovery of metals, comprising extraction, scrubbing and stripping stages. Each stage includes at least one step comprising a mixer and settler units, whereby the settler of one step of the system stage is designed and constructed to function as an organic solution storage tank and the organic solution overflow launder as a pumping tank.

According to one embodiment of the invention, the extraction step of the extraction stage comprises an organic solution storage and pumping tank.

According to another embodiment of the invention, the scrubbing step of the extraction stage comprises an organic solution storage and pumping tank.

According to one embodiment of the invention, the stripping step of the extraction stage comprises an organic solution storage and pumping tank.

The volume of the settler unit in the system accordant with the invention is shaped by raising the height of the end and side walls to be such that the settler unit in question can hold a sufficient amount of the organic solution circulating in the process when necessary.

LIST OF DRAWINGS

FIG. 1 presents a typical settler unit of a step in the system accordant with the invention, as seen from the side.

DETAILED DESCRIPTION OF THE INVENTION

The invention now presented relates to a liquid-liquid extraction system for is use in the recovery of metals, where the system includes the stages normally used, such as extraction, organic solution scrubbing and stripping stages. It is typical of the system that it does not include a separate organic storage tank, but instead a selected step of a chosen stage in the system and in particular its settler unit is designed and constructed to function as the organic storage and pumping tank.

When a step belonging to the extraction system consists of a mixer and a settler unit, there is an organic solution launder in the rear of the settler unit, into which the settled organic solution flows as an overflow. At the back of the organic solution launder there is an aqueous solution recovery apparatus, into which the settled aqueous solution flows below the organic solution overflow launder. A typical system of this type is described for instance in U.S. Pat. No. 6,132,615.

In a system accordant with the invention the settler unit of any extraction step whatever is chosen to function as an organic solution storage and pumping tank in addition to its normal operation. Then the settler unit of the step is designed and its volume is shaped to be such that it can, where necessary, store the required amount of organic extraction solution contained in the process. The organic solution overflow launder in the rear of the settler unit is equipped with the pumping equipment required so that it can function as a pumping tank. The aqueous solution recovery equipment functions in the typical way and the operation of the organic solution storage and pumping tank does not have any significant effect on it.

FIG. 1 presents the principle diagram of a settler unit 1 of a step belonging to an extraction system. The aqueous and organic solutions are mixed together into a dispersion in the mixer unit of the step (not illustrated), and are fed into the settler unit via a feed unit 2. In the settler unit the dispersion 3 gradually separates into two settled layers; the aqueous solution 4 to the bottom of the settler and the lighter organic solution 5 on top of the aqueous is solution (or dispersion). The organic solution is removed as the overflow into the overflow launder 6, which is equipped with a pumping unit 7. The aqueous solution flows into the discharge launder 8 of the aqueous solution at the rear of the bottom of the settler unit, which is equipped with its own pumping equipment 9. According to the drawing, the volume of the settler is made greater than the requirement for normal use by raising the height of the end walls 10, 11 and of course the side walls (not illustrated), i.e. such that the settler concerned can, when necessary, hold a sufficient amount of the organic solution circulating in the process. The end wall 11 raised at the back is specifically the back wall of the organic solution overflow launder and the rear wall 12 of the whole tank is also the back wall of the aqueous solution discharge launder. The settler unit is also preferably equipped with picket fences 13, which promote the separation of the dispersion into settled phases. The number and shape of the picket fences can be selected as desired.

One of the advantages of the system according to the invention can be considered the fact that the amount of organic solution can be reduced considerably in the system, by 10-40% compared with a conventional system equipped with a storage tank. As a result, the fire load of a possible fire is decreased, occupational hygiene conditions are improved and the impact on the environment caused by any possible process leaks is reduced. Since one tank is completely omitted, this also reduces the costs caused by piping and overall the investment cost of the new system is considerably decreased in comparison with a conventional system.

The invention claimed is:

1. An aqueous solution and organic solution liquid-liquid extraction system for hydrometallurgical recovery of metals, the system comprising extraction, scrubbing and stripping stages, wherein at least one stage contains at least a mixer and settler unit, wherein the settler unit is an organic solution storage tank and an organic solution overflow launder as including a pumping unit.

2. A system according to claim 1, wherein the extraction stage comprises an organic solution storage tank and pumping tank.

3. A system according to claim 1, wherein the scrubbing stage comprises an organic solution storage tank and pumping tank.

4. A system according to claim 1, wherein the stripping stage comprises an organic solution storage tank and pumping tank.

5. A system according to claim 1, wherein the settler unit includes end walls, side walls and a rear wall, the end and side walls extending vertically more than the rear wall, and the volume of the settler unit is determined by the height of the end and side walls.

* * * * *